US012611682B2

(12) United States Patent
Qiu

(10) Patent No.: US 12,611,682 B2
(45) Date of Patent: Apr. 28, 2026

(54) SPRAY HEAD ASSEMBLY, DISPENSING SYSTEM, ELECTRODE SHEET STRIP, AND ELECTRODE

(71) Applicant: NORDSON CORPORATION, Westlake, OH (US)

(72) Inventor: Zhongquan Qiu, Shanghai (CN)

(73) Assignee: Nordson Corporation, Westlake, OH (US)

( * ) Notice: Subject to any disclaimer, the term of this patent is extended or adjusted under 35 U.S.C. 154(b) by 63 days.

(21) Appl. No.: 18/553,925

(22) PCT Filed: Apr. 15, 2022

(86) PCT No.: PCT/CN2022/087132
§ 371 (c)(1),
(2) Date: Oct. 4, 2023

(87) PCT Pub. No.: WO2022/218418
PCT Pub. Date: Oct. 20, 2022

(65) Prior Publication Data
US 2024/0207883 A1 Jun. 27, 2024

(30) Foreign Application Priority Data
Apr. 16, 2021 (CN) ......................... 202120793551.3

(51) Int. Cl.
*B05B 1/04* (2006.01)
*B05B 1/00* (2006.01)

(52) U.S. Cl.
CPC ................ *B05B 1/044* (2013.01); *B05B 1/00* (2013.01)

(58) Field of Classification Search
CPC .. B05B 1/00; B05B 1/04; B05B 1/042; B05B 1/044
USPC .......................................................... 239/568
See application file for complete search history.

(56) References Cited

U.S. PATENT DOCUMENTS 6,171,089 B1 1/2001 Oehman, Jr.
6,296,463 B1 10/2001 Allen
11,724,266 B2 * 8/2023 Qiu ....................... B05B 9/0413 222/146.2
12,083,552 B2 * 9/2024 Qiu ..................... B05C 11/1034
(Continued)

FOREIGN PATENT DOCUMENTS

CN 108855657 A 11/2018
CN 109817875 A 5/2019
(Continued)

*Primary Examiner* — Jason J Boeckmann
(74) *Attorney, Agent, or Firm* — BakerHostetler

(57) ABSTRACT

The disclosure relates to a nozzle assembly, a dispensing system, an electrode sheet strip, and an electrode. The nozzle assembly includes a lip member configured to have an annular body portion and a dam member at the center; and a cover plate configured to be connected to the lip member. The, dam component is recessed relative to a surface of the lip member connected to the cover plate, so that a reservoir is formed between the cover plate and the dam component. The reservoir is in fluid communication with a rectangular opening; and a recess is arranged on one of the two surfaces of the cover plate and the lip member facing each other. The recess is in fluid communication with the reservoir so that fluid can flow out of the reservoir through the recess in a strip shape.

30 Claims, 13 Drawing Sheets

(56) References Cited

U.S. PATENT DOCUMENTS

| | | | |
|---|---|---|---|
| 2005/0220931 | A1 | 10/2005 | Schwersenz et al. |
| 2014/0000511 | A1 | 1/2014 | Wang et al. |
| 2020/0136133 | A1 | 4/2020 | Umehara |

FOREIGN PATENT DOCUMENTS

| | | | | | |
|---|---|---|---|---|---|
| CN | 111342053 | A | | 6/2020 | |
| CN | 215141578 | U | | 12/2021 | |
| CN | 215695356 | U | | 2/2022 | |
| JP | 2007125503 | A | * | 5/2007 | |
| KR | 10-2019-0083530 | A | | 7/2019 | |
| TW | 202102310 | A | | 1/2021 | |
| WO | WO-2018208876 | A1 | * | 11/2018 | ........... B05C 5/0254 |
| WO | WO-2020106923 | A1 | * | 5/2020 | ........... B05C 5/0258 |

* cited by examiner

SPRAY HEAD ASSEMBLY, DISPENSING SYSTEM, ELECTRODE SHEET STRIP, AND ELECTRODE

CROSS-REFERENCE TO RELATED APPLICATION

This application is a National Phase application of International Patent Application No. PCT/CN2022/087132, filed Apr. 15, 2022, which claims priority to Chinese Patent Application No. 202120793551.3, filed Apr. 16, 2021, the entire disclosures of both of which are hereby incorporated by reference as if set forth in their entirety herein.

TECHNICAL FIELD

The present application relates to a nozzle assembly, a distribution system, an electrode sheet strip and an electrode.

BACKGROUND

Electric vehicles (EV) are a development direction of current automobile technology. An endurance is an important parameter to characterize the performance of electric vehicles. The endurance is largely determined by the performance of the EV battery. Lithium-ion batteries such as so-called chip batteries are a very important direction of battery research. Typically, lithium-ion batteries for electric vehicles, especially chip batteries, have an aluminum casing inside which the cells are housed. Multiple lithium-ion batteries are placed side by side to form a battery pack. Lithium-ion batteries need to be insulated while pursuing the possible lowest coating weight.

Furthermore, under normal circumstances, when a lithium battery is being charged, lithium ions are deintercalated from the positive electrode and then intercalated into the negative electrode; however, under abnormal conditions such as overcharge, low temperature or high current, the lithium ions deintercalated from the positive electrode will be abnormally intercalated in the negative electrode. In this case, lithium ions can only be precipitated on the surface of the negative electrode. This is known as lithium precipitation. If the phenomenon of lithium precipitation occurs, lithium ions will be reduced to metal lithium in different forms on the surface of the negative electrode, one of which is called lithium dendrite, which will continue to grow like a tree branch with the progress of the phenomenon of lithium precipitation, and this process is irreversible; and when lithium dendrites grows to a certain length, it will break through the diaphragm between the positive and negative electrodes, resulting in an internal short circuit of the cell, which is very likely to cause thermal runaway or even an explosion, which is very dangerous.

Accordingly, a very thin adhesive material needs to be coated on the surface of the battery. Generally, it is required to be able to evenly coat the thermal adhesive material larger than 10 mm (width) and less than 20 μm (thickness) on the electrode sheet of the battery, which is very important for improving the reliability of automobile batteries. The hot glue must be extremely thin and evenly coated on the surface of the electrode sheet. Also, electrode segments for forming electrodes are usually formed by cutting the electrode sheet, and the outer edges of the electrode sheet also need to be protected before cutting, especially during slitting the electrode sheet to form the electrode segments. This is obviously a serious challenge to existing coating products. Current methods and products have difficulty in achieving a uniform coating thickness of less than 20 μm on the electrode sheet and applying glue to the entire surface of the cathode segment used to form the cathode.

Thus, there is a need for improving the coating equipment or dispensing system, as well as glue dispensing methods.

SUMMARY OF DISCLOSURE

An aspect of the present disclosure is to provide a nozzle assembly, which can apply fluid such as glue, especially polyurethane liquid glue, with high precision, so as to realize an extremely thin glue layer. Further, the disclosure also provides a distribution system, an electrode sheet strip and an electrode.

According to the present disclosure, there is provided a nozzle assembly, which is characterized by comprising: a lip member configured to have an annular body portion and a dam member at the center, the dam member extending from a bottom edge of a rectangular space surrounded by the body portion toward a top edge such that a rectangular opening is formed between a top edge of the dam member and the top edge of the rectangular space, the dam member extending an entire width of the rectangular opening in a transverse direction of the lip member, the rectangular opening being adapted to receive a fluid; and a cover plate configured to be connected to the lip member, wherein the dam member is recessed relative to a surface of the lip member connected to the cover plate so that a reservoir is formed between the cover plate and the dam member, the reservoir being in fluid communication with the rectangular opening, and a recess is provided on one of two surfaces of the cover plate and the lip member facing each other, the recess being in fluid communication with the reservoir so that the fluid can flow out from the reservoir through the recess in a strip shape.

In this way, the thickness and width of the fluid dispensed from the recess can be precisely and stably controlled so that a desired thickness, especially an extremely thin coating can be obtained on the substrate/workpiece.

Preferably, the recess is provided on a surface of the lip member facing the cover plate. As a result, the recess can be produced in a simple and efficient manner. And, preferably, in the transverse direction, a width of the recess is less than or equal to a width of the dam member, so that fluid can flow out from the space uniformly through the recess in a strip shape.

Preferably, the recess has a consistent depth with respect to the surface on which the recess is provided, and the recess is recessed by 50 to 150 μm with respect to the surface on which the recess is provided. Thus, an extremely thin adhesive layer can be coated on the surface of the substrate.

Preferably, the dam member is recessed with respect to a surface on a side of the lip member opposite to the cover plate.

Preferably, a boss is provided on an outer edge of a side of the lip member connected to a seal, for limiting the movement of the seal.

Preferably, a guide boss is provided on a bottom surface of the cover plate and/or a bottom surface of the lip member.

Preferably, the cover plate and the lip member are fixed together by screws in this order. Thereby, simple assembly can be realized.

According to the present disclosure, there is also provided a dispensing system characterized by comprising: a fluid supply assembly; a metering assembly in a form of a volumetric cavity pump and configured to be in fluid communication with the fluid supply assembly to receive a fluid from the fluid supply assembly; and a nozzle assembly in fluid communication with the metering assembly to receive the fluid from the metering assembly, wherein the nozzle assembly is a nozzle assembly described above.

Preferably, the fluid supply assembly includes a feeding container. The feeding container is configured to accommodate a fluid cartridge or to be connected with a pipe for supplying the fluid.

Preferably, the metering assembly includes a driving gear and a driven gear. The driving gear is driven by a motor.

Preferably, the metering assembly includes: a top plate having a top plate flow passage for receiving the fluid from the fluid supply assembly; a bottom plate having a bottom plate flow passage in fluid communication with a rectangular opening of the nozzle assembly; and a gear support plate located between the top plate and the bottom plate and having an aperture at the center for accommodating the driving gear and the driven gear.

Preferably, respective gear shafts of the driving gear and the driven gear are inserted into corresponding bores of the bottom plate to provide positioning of the gear shafts.

Preferably, a clearance between the driving gear and the driven gear on one side of the metering assembly is in fluid communication with the top plate flow passage of the top plate, and a clearance between the driving gear and the driven gear on the other side of the metering assembly is in fluid communication with the bottom plate flow passage of the bottom plate.

Preferably, a sealing member is provided between the gear support plate and the bottom plate, the sealing member surrounding an aperture in the gear support plate.

Preferably, the lip member of the nozzle assembly is connected to the bottom plate such that the top edge of the dam member is higher than the outlet of the bottom plate flow passage.

Preferably, a seal is provided between the lip member and the bottom plate, the seal having a rectangular central opening. A width of the central opening is greater than or equal to a width of the rectangular opening, and a height of the central opening is greater than or equal to a distance from the top edge of the rectangular opening to a bottom edge of the outlet of the bottom plate flow passage of the bottom plate.

Preferably, the bottom plate has a protrusion in which the outlet of the bottom plate flow passage of the bottom plate is arranged, the protrusion being adapted to be connected to the lip member.

The present application also relates to a method of dispensing a fluid onto a substrate having a thinner portion using said dispensing system, characterized in that said method comprises a step of dispensing a fluid onto the thin portion of the substrate using the dispensing system.

Preferably, the substrate is an electrode sheet for manufacturing an electrode of a battery, the electrode sheet having a thicker body portion and a thinner edge portion, the edge portion being located on a side of the body portion and continuous with the body portion, the method comprising a step of: dispensing the fluid onto a surface of the edge portion using the dispensing system, to produce an electrode sheet strip. The battery may be a chip battery.

Preferably, the method comprises: feeding the electrode sheet to a slitting machine, and slitting the edge portion along a slitting path using the slitting machine; and after the slitting, dispensing the fluid onto the surface of the edge portion using the dispensing system.

Preferably, the slitting machine starts slitting at a certain distance from a leading end of the electrode sheet, and ends the slitting at a certain distance from a trailing end of the electrode sheet.

Preferably, the edge portion of the electrode sheet is slit such that a width of a slit on the edge portion is suitable for the fluid from the dispensing system to completely penetrate the slit.

Preferably, the width of the slit is determined according to a thickness of the edge portion, a coating temperature of the fluid, and/or a sheet feeding speed.

Preferably, a slitting path is non-linear.

Preferably, the edge portion is slit to form a plurality of electrode ears along said slitting path. The electrode ears are preferably trapezoidal.

The present application also provides an electrode sheet strip for manufacturing an electrode of a battery, characterized in that: the electrode sheet strip is manufactured using the above method.

Preferably, the electrode sheet strip is cut into a plurality of sheet segments having the same shape along a width direction, and the plurality of sheet segments are laminated together to constitute the electrode.

The present application also provides an electrode, which is characterized in that the electrode is manufactured from the above electrode sheet strip.

Preferably, the electrode is an anode or a cathode of a battery.

The nozzle assembly and distribution system of the disclosure can realize an extremely thin glue thickness, for example, less than 20 μm, thereby meeting the spraying requirements on the surface of chip battery of electric vehicles. The method described in this application can glue the outer edge of the chip battery's electrode ears for protection.

BRIEF DESCRIPTION OF DRAWINGS

These and other objects and advantages of the present disclosure will appear more fully from the following description taken in conjunction with the accompanying drawings, wherein the same reference numerals are used throughout the drawings to indicate the same or similar parts, and wherein.

DETAILED DESCRIPTION

Embodiments according to the present disclosure will be described in detail below with reference to the accompanying drawings. In the description of the drawings, the same or corresponding parts are denoted by the same numerals and symbols, and repeated descriptions will be omitted. In the following description, terms such as "up", "down", "front", "rear", "top" and "bottom" representing directions are only used to describe the drawings, and do not constitute a substantive limitation to the present disclosure.

Figure 1:
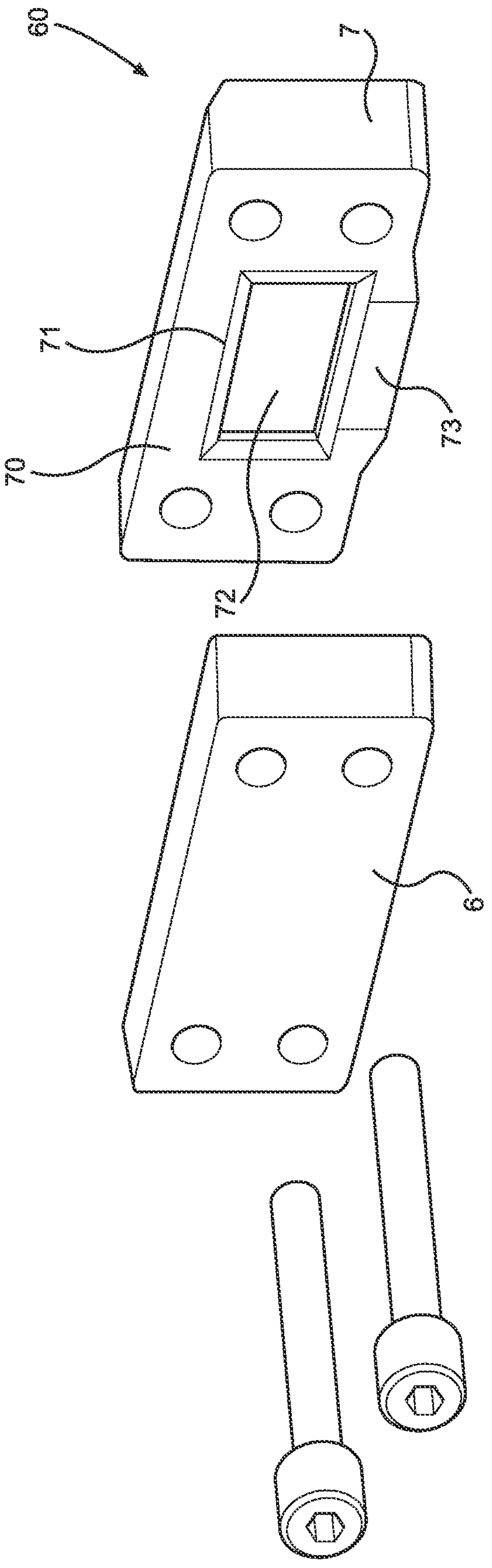
FIG. 1 is an oblique front exploded view showing a nozzle assembly according to the present disclosure.

FIG. 1 is an oblique front exploded view showing a nozzle assembly according to the present disclosure. As shown in FIG. 1, the nozzle assembly 60 mainly includes a lip member 7 and a cover plate 6. The lip member 7 is generally rectangular plate-shaped and has an annular body portion 70 and a dam member 72 at the center extending from the bottom edge towards the top edge of the rectangular space enclosed by the body portion 70 such that a rectangular opening 71 is formed between the top edge of the dam member 72 and the top edge of the rectangular space. The dam member 72 extends the entire width of the rectangular opening 71 in the transverse direction of the lip member 7. The transverse direction of the lip member 7 is the same as the transverse direction of the rectangular opening 71. The rectangular opening 71 is adapted to receive fluid. For example, the rectangular opening 71 can be fluidly connected to a fluid supply, a metering assembly connected to the fluid supply, or the like.

Figure 3:
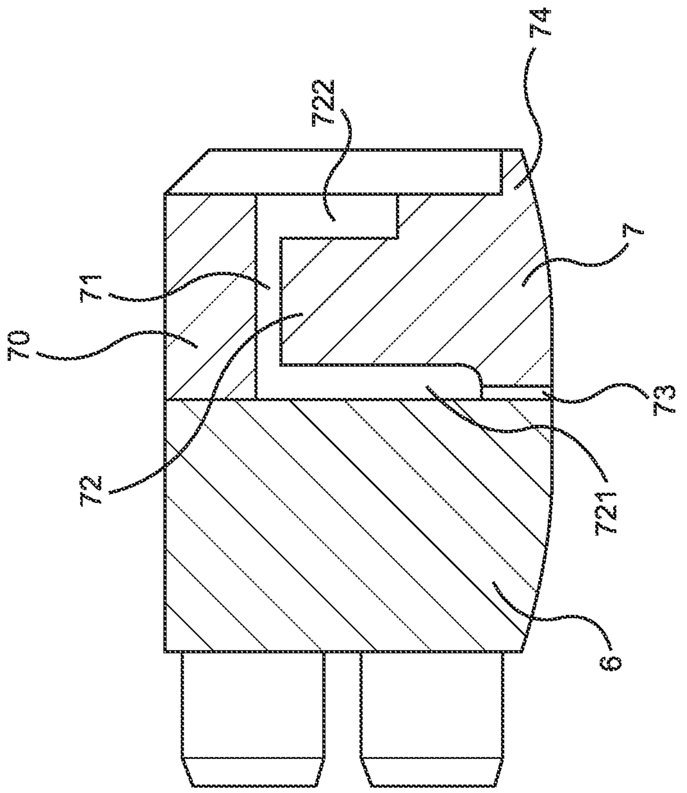
FIG. 3 is a sectional view taken along line III-III in FIG. 2 showing the nozzle assembly according to the present disclosure.

The cover plate 6 is configured to be connected to the lip member 7. The front surface of the cover plate 6 is flat and the rear surface is intended to be connected with the lip member 7. The dam member 72 is recessed to a certain depth relative to the surface of the lip member 7 that is connected to the cover plate 6, that is, the front surface, so that a reservoir 721 is formed between the cover plate 6 and the dam member 72 (see FIG. 3), the reservoir 721 being in fluid communication with the rectangular opening 71. On one of the two surfaces of the cover plate 6 and the lip member 7 facing each other is provided a recess 73 whose width in the transverse direction of the lip member 7 is significantly larger than its depth. The recess 73 is in fluid communication with the reservoir 721 so that the fluid can flow out from the reservoir 721 through the recess 73 in a strip shape. For example, as shown in FIGS. 1 and 3, on the surface of the lip member 7 facing the cover plate 6, that is, the front surface, is provided the recess 73, and a width of the recess 73 in the transverse direction is less than or equal to a width of the dam member 72. In the transverse direction of the lip member 7, the width of said dam member 72 is equal to the width of the rectangular opening 71.

The recess 73 is recessed by 50 μm to 150 μm relative to the surface on which the recess 73 is provided. The recessed depth of the recess 73 is preferably uniform.

And, for example, as clearly shown in FIG. 3, the dam member 72 is recessed to a consistent depth with respect to the surface of the lip member 7 facing the cover plate 6, i.e., the front surface. However, the configuration of the dam member 72 is not limited thereto, but the dam member 72 may extend obliquely rearward from the bottom of the dam member 72 toward its top.

Figure 2:
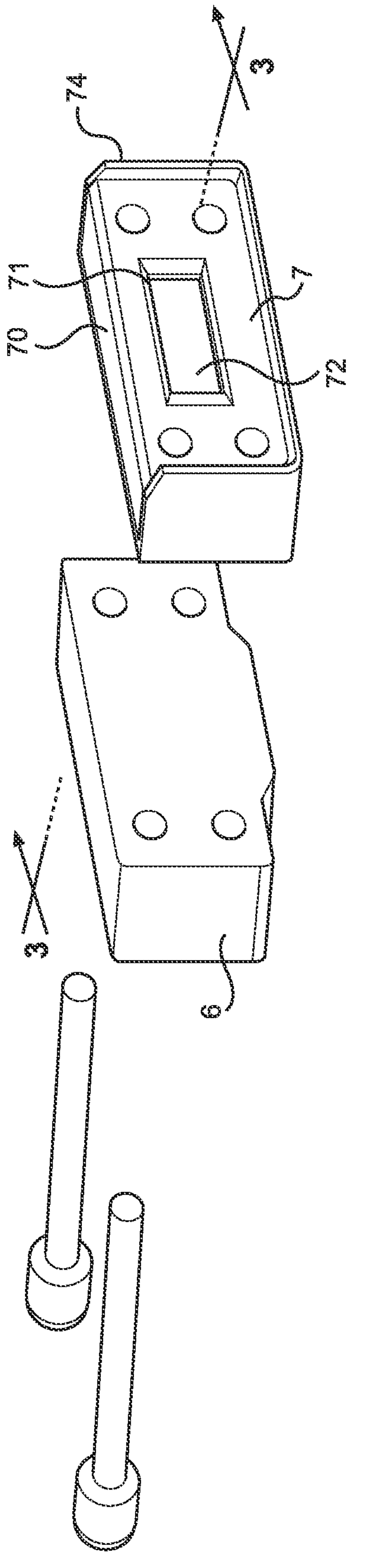
FIG. 2 is an oblique rear exploded view showing the nozzle assembly according to the present disclosure.

FIG. 2 is an oblique rear exploded view showing the nozzle assembly according to the present disclosure. As shown in FIG. 2, the back side of the cover plate 6, that is, a surface of the cover plate 6 connected to the lip member 7 is preferably flat.

FIG. 3 is a sectional view taken along line III-III in FIG. 2 showing the nozzle assembly according to the present disclosure. As shown in FIG. 3, preferably or additionally, the dam member 72 is recessed relative to the surface of the lip member 7 on the side opposite to the cover plate 6, that is, the back surface, so that a space serving as a reservoir 722 is formed on the side of the dam member 72 opposite to the cover plate 6. It is easy to understand that the recessed depth of the reservoir 722 may be 0, that is, the reservoir 722 is not provided.

The outer edge of the lip member 7 on the side opposite to the cover plate 6 is preferably provided with a boss 74 for receiving a sealing member and restricting the movement of the sealing member. The cover plate 6 and the lip member 7 are fixed together by screws, for example.

A thickness of the dam member 72 is not specifically limited here, and generally the thickness is smaller than the thickness of the lip member 7. The thickness of the dam member 72 and the recessed depth on both sides can be determined according to specific coating requirements. As shown in FIG. 3, on the side of the dam member 72 facing the cover plate 6, the bottom edge of the dam member 72 transitions smoothly with the top edge of the recess 73 to facilitate a flow of the fluid material. The recessed depth of the reservoir 721 is not particularly limited. For example, the recessed depth of the reservoir 721 is approximately equal to the height of the opening 71. The recessed depth of the reservoir 722 is less than or equal to the height of the opening 71, in other words, the depth of the reservoir 722 is less than or equal to the distance from the top edge to the bottom edge of the opening 71. The lip member 7 has approximately the same thickness as the cover plate 6. The lip member 7 and the cover plate 6 have approximately the same transverse cross-sectional outer profile.

Figure 4:
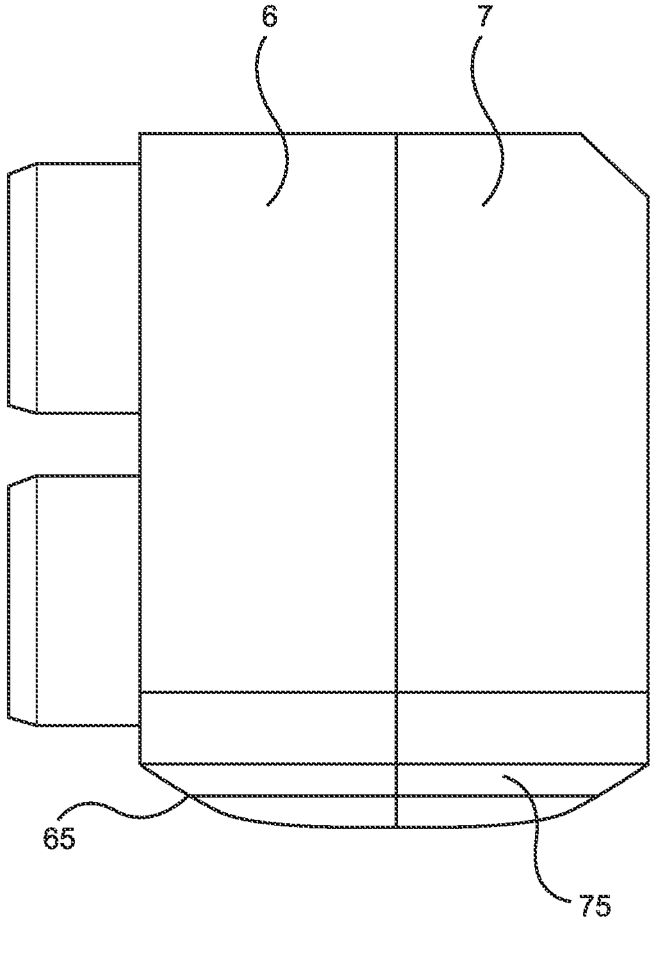
FIG. 4 shows a side view of the nozzle assembly according to the present disclosure.

FIG. 4 shows a side view of the nozzle assembly according to the present disclosure. As shown in FIG. 4, preferably, the surfaces of the cover plate 6 and the lip member 7 facing the workpiece to be coated, i.e. the bottom surfaces, can have guide bosses 65 and 75 respectively, and after assembly, the height equalness, flatness, roughness, etc. of the cover plate 6 and the lip member 7 are very small, so as to avoid scuffing and scratching the surface of the workpiece to be coated in the working state.

Figure 5:
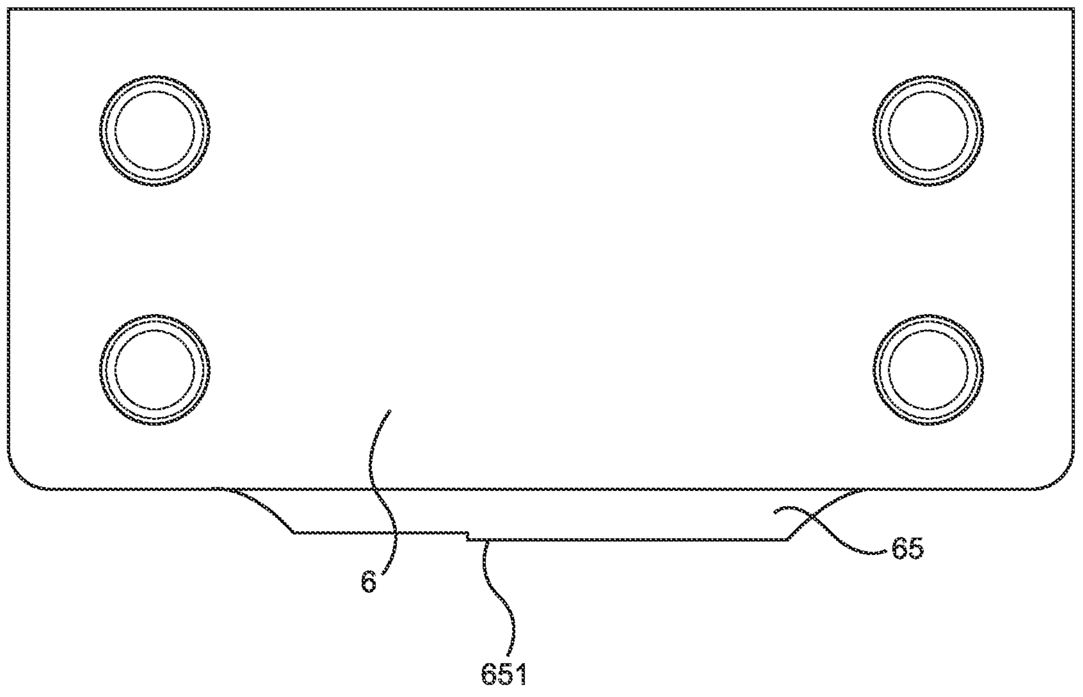
FIG. 5 shows a front view of the nozzle assembly according to the present disclosure.

FIG. 5 shows a front view of the nozzle assembly according to the present disclosure. As shown in FIG. 5, the bottom surface of the guide boss 65 of the cover plate 6 has a step 651. However, it is conceivable that the guide bosses on the bottom surfaces of the cover plate 6 and the lip member 7 may be flat, and alternatively or additionally there may be steps, and the steps may be provided at any position and have any length and height. The specific size of the steps can be determined according to the actual spraying requirements.

Figure 6:
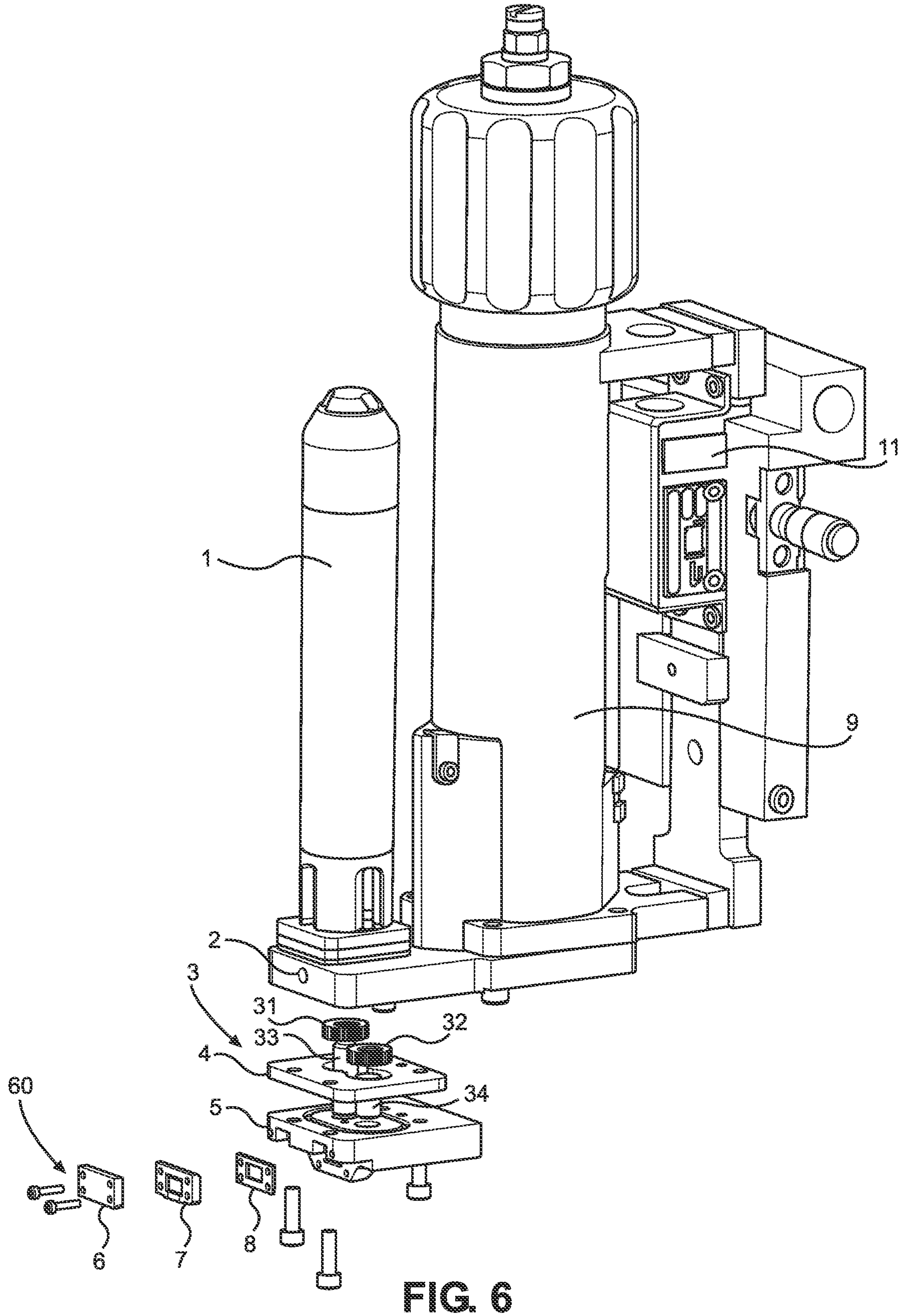
FIG. 6 is an exploded view showing a dispensing system comprising a nozzle assembly according to the present disclosure.

FIG. 6 is an exploded view showing a dispensing system including a nozzle assembly according to the present disclosure. As shown in FIG. 6, the dispensing system includes a fluid supply assembly, a metering assembly 3 and a nozzle assembly 60. However, it will be appreciated that a fluid supply assembly and/or a metering assembly 3 are not necessary, but that the nozzle assembly 60 may be directly connected to a fluid supply source. The fluid supply assembly includes a feeding container 9. The feeding container 9 can accommodate fluid tanks of various specifications inside, for example, a 300 cc glue tank. Fluid materials suitable for dispensing are not limited to liquid glue, but can be various other fluid materials in the spraying process. The liquid glue can be insulating liquid glue or conductive liquid glue. Generally, conductive liquid glue contains conductive substances to conduct electricity after being coated on the workpiece surface. Instead of using a fluid tank, the feeding container 9 can be connected to a hose or other connection pipe. The hose or other connection pipe is directly connected to another metering system and/or fluid source. In the present disclosure, if a hose connection is used, the cut-off control module must be set at a position where the fluid starts to flow into the metering assembly 3.

The metering assembly 3 is an integrated metering system and is in the form of a volumetric cavity pump. The volumetric cavity pump can have a variety of configurations. The metering assembly 3 is configured to be in fluid communication with the feeding container 9 to receive fluid from the feeding container 9. As shown in FIG. 6, for example, the metering assembly 3 mainly includes a gear set, namely a driving gear 31 and a driven gear 32. The driving gear is driven by a driving device such as a motor 1. The motor 1 is, for example, a servo motor. The driving gear 31 and the driven gear 32 form a micro gear set, which can transport fluid.

The metering assembly 3 also includes: a top plate 2 which has a top plate flow passage for receiving the fluid from the feeding container 9; a bottom plate 5 which has a bottom plate flow passage which is in fluid communication with the nozzle assembly 60, for example the rectangular opening 71 of the nozzle assembly 60; and a gear support plate 4 which is located between the top plate 2 and the bottom plate 5. The gear support plate 4 has an aperture at a central portion for receiving the driving gear 31 and the driven gear 32. That is, the micro gear set constituted by the driving gear 31 and the driven gear 32 is arranged in the gear support plate 4, thereby constituting an internal metering pump.

A clearance between the driving gear 31 and the driven gear 32 on one side of the metering assembly 3 is in fluid communication with the top plate flow passage of the top plate 2, and a clearance between the driving gear 31 and the driven gears 32 on the other side of the metering assembly 3 is in fluid communication with the bottom plate flow passage of the bottom plate 5. Fluid can thus flow from the top plate 2 via the gear set into the bottom plate 5.

Preferably, a seal is provided between the gear support plate 4 and the bottom plate 5, the seal surrounding the aperture in the gear support plate 4. The lip member 7 of the nozzle assembly 60 is attached to the bottom plate 5 such that the top edge of the dam member 72 is higher than the outlet of the bottom plate flow passage.

Thus, with the metering pump, fluid such as hot glue can be accurately and adequately delivered to the nozzle assembly. Specifically, the inner space of the metering pump, that is, the metering assembly 3, is in fluid communication with the feeding container 9, so as to be able to receive fluid material from the feeding container 9. The nozzle assembly 60 is in fluid communication with the metering assembly 3 so as to be able to receive fluid material from the metering assembly 3. The fluid material can sequentially pass through the fluid supply assembly, specifically the feeding container 9, the metering assembly 3, the opening 71 in the lip member 7, and then flow out of the nozzle assembly in an accurate amount through the recess 73 between the lip member 7 and the cover plate 6.

The feeding container 9 can be fixed together and in fluid communication with the metering assembly 3 in a number of ways. Preferably, the feeding container 9 is directly arranged on the top plate 2 of the metering assembly 3 and is in fluid communication with the top plate flow passage in the top plate 2. The drive device, such as a motor 1 for driving the metering assembly 3, and the feeding container 9 are arranged side by side on the top plate 2. Fluid material from the feeding container 9 flows into the metering assembly 3 via the top plate flow passage in the top plate 2.

A gear shaft 33 of the driving gear 31 and a gear shaft 34 of the driven gear 32 of the metering assembly 3 (with reference to FIGS. 8-9) pass through the gear support plate 4 and then are inserted into the top plate 2 and the bottom plate 5 at both ends. The motor 1 and the gear set are arranged on opposite sides of the top plate 2, respectively. The gear shaft 33 of the driving gear 31 is drivingly connected with the output shaft (not shown) of the motor 1 through a through hole provided in the top plate 2. Both ends of the gear shaft 34 of the driven gear 32 are respectively inserted into a hole provided in the top plate 2 and a hole provided in the bottom plate 5. Thus, the gear shaft 34 of the driven gear 32 supports the driven gear 32 on the one hand, and realizes the positioning of the gear set on the other hand. The top plate 2, the gear support plate 4 and the bottom plate 5 are preferably fixed together by screws.

The dispensing system also includes a control assembly 11 to control the operation of the dispensing system. The control assembly 11 can be fixed to the housing of the feeding container 9, for example fixedly connected to the feeding container 9 on the side of the feeding container 9 opposite the motor 1.

Figure 7:
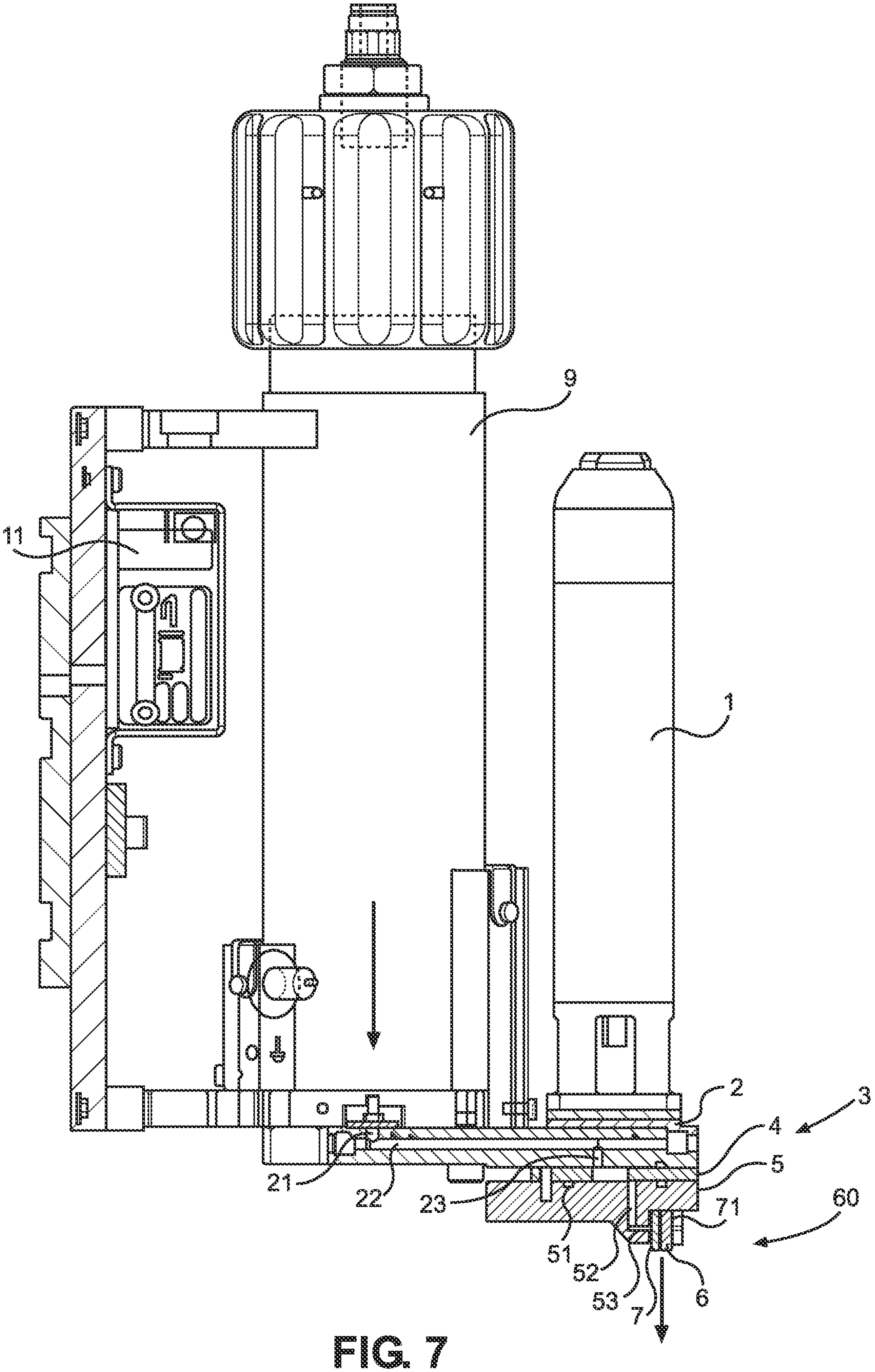
FIG. 7 is a cross-sectional view showing the dispensing system.

FIG. 7 is a sectional view showing a dispensing system according to the present disclosure. FIG. 7 shows the flow path of the fluid material inside the dispensing system. Specifically, as shown in FIG. 7, the fluid material from the feeding container 9 flows into the top plate flow passage of the top plate 2 of the metering assembly 3 through the outlet of the feeding container 9. The top plate 2 for example internally includes a vertical flow passage 21, a horizontal flow passage 22 and a vertical flow passage 23 sequentially, these flow passages are in fluid communication sequentially and correspond to the top plate flow passage in the Summary. Fluid material from the feeding container 9 enters the vertical flow passage 21 of the top plate 2 and then flows through the horizontal flow passage 22 and the vertical flow passage 23. The fluid material from the vertical flow passage 23 of the top plate 2 enters the input side clearance of the metering assembly 3, and then enters the output side clearance of the metering assembly 3 driven by the gear pair, namely the driving gear 31 and the driven gear 32. The fluid material from the output side clearance of the metering assembly 3 flows into the bottom plate flow passage of the bottom plate 5 of the metering assembly 3, specifically first into the vertical flow passage 52 of the bottom plate 5 and then into the horizontal flow passage 53 of the bottom plate 5. Fluid material from the horizontal flow passage 53 of the bottom plate 5 flows through the opening 71 between the dam member 72 (see FIG. 3) at the center of the lip member 7 of the nozzle assembly 60 and the annular body portion 70 of the lip member 7, and then flows out from the recess 73 or slot between the lip member 7 and the cover plate 6 for being dispensed onto the surface of the workpiece or substrate.

Figure 8:
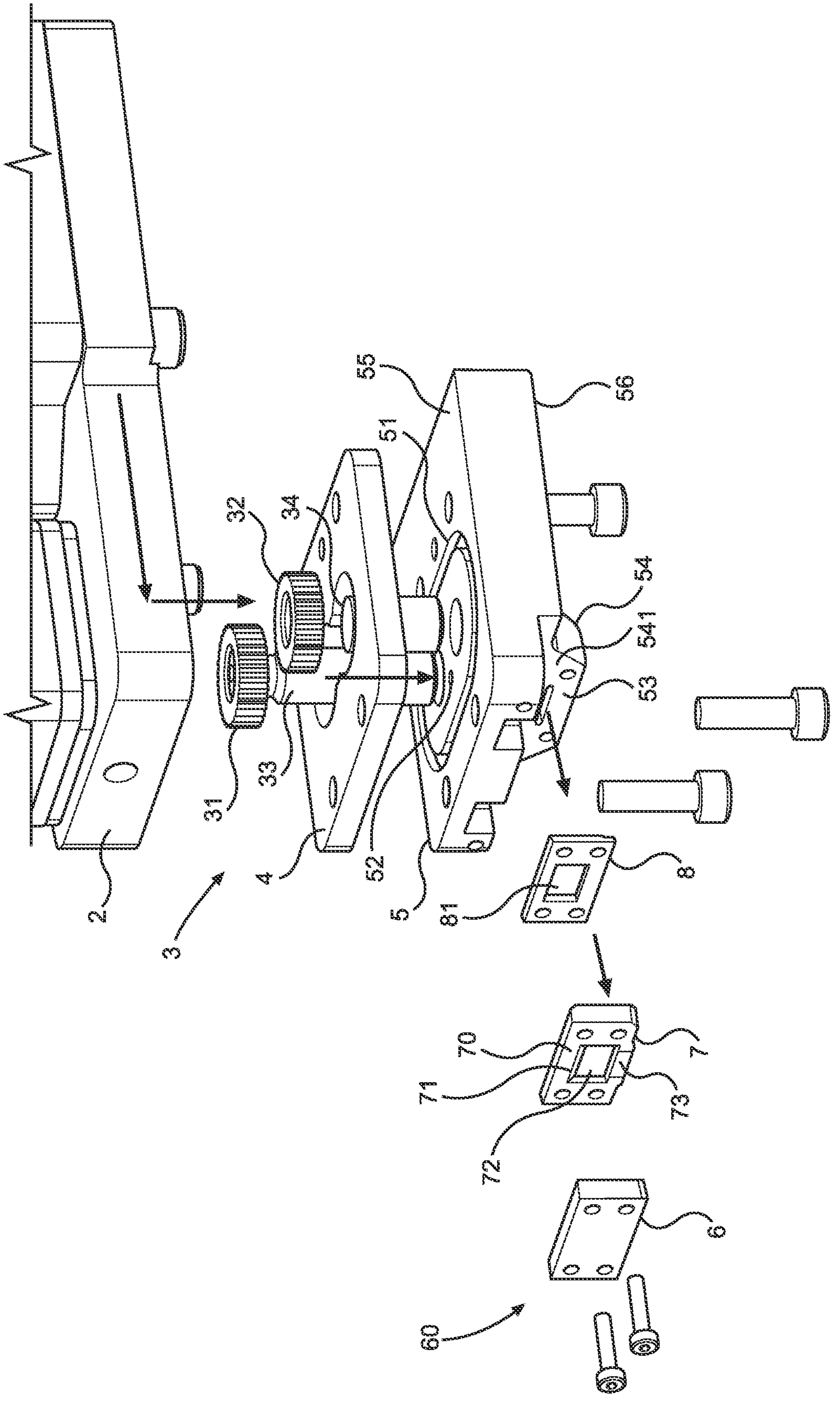
FIG. 8 is an oblique front exploded view showing a portion of the dispensing system.

FIG. 8 is an oblique front exploded view showing a portion of the dispensing system according to the present disclosure. As shown in FIG. 8, the nozzle assembly 60 is in fluid communication with the metering assembly 3. The output side clearance of the gear set of the metering assembly 3 is aligned with the inlet of the vertical flow passage 52 of the bottom plate 5, whereby fluid material from the gear set of the metering assembly 3 can flow into the bottom plate flow passage of the bottom plate 5. The bottom plate 5 may be a substantially rectangular plate, in which case both the vertical flow passage 52 and the horizontal flow passage 53 of the bottom plate 5 are formed inside the body of the rectangular bottom plate 5. However, the bottom plate 5 may have a protrusion 54 protruding from the bottom surface 56. A vertical flow passage 52 extends downward from a top surface 55 of the bottom plate 5 into the protrusion 54, and a horizontal flow passage 53 can be provided in the protrusion 54 to be in fluid communication with the vertical flow passage 52 (as shown in FIG. 7). With this protrusion 54, the overall thickness of the bottom plate 5 can be appropriately reduced, thereby reducing the weight of the bottom plate 5. The protrusion 54 has a joint surface 541, preferably a planar surface. The outlet of the horizontal flow passage 53 is disposed in the protrusion 54, specifically on the joint surface 541. The joint surface 541 of the bottom plate 5 of the metering assembly 3 is suitable for being connected to the corresponding surface of the lip member 7 of the nozzle assembly 60. The vertical flow passage 52 and the horizontal flow passage 53 can have various cross-sectional shapes, for example, circular cross-sectional shapes. Preferably, the horizontal flow passage 53 may have a flat mouth-shaped cross-section, in other words, its cross-section has a slot shape. The bottom plate flow passages of the bottom plate 5 are not limited to the vertical flow passages 52 and the horizontal flow passages 53, but may have other forms of flow passages. For example, another flow passage may be provided between the vertical flow passage 52 and the horizontal flow passage 53.

The bottom plate 5 preferably has a sealing groove 51 on a top surface 55. A sealing groove corresponding to this sealing groove 51 is located on the bottom surface of the gear support plate 4. The sealing groove 51 and its corresponding sealing groove form an accommodating space, within which a sealing member is arranged. The sealing member surrounds the inner space of the metering assembly 3 to achieve fluid tightness.

The lip member 7 of the nozzle assembly 60 may be directly connected to the bottom plate 5 of the metering assembly 3 such that the top edge of the dam member 72 is higher than the outlet of the horizontal flow passage 53 and the opening 71 is in fluid communication with the outlet of the horizontal flow passage 53. Said opening 71 is in fluid communication with the horizontal flow passage 53 via a reservoir 722 (see FIG. 3) of the lip member 7, which is located on a side of the lip member 7 opposite to the cover plate 6 or a side of the lip member 7 facing the bottom plate 5. Various configurations of fluid communication between the opening 71 and the outlet of the horizontal flow passage 53 are contemplated. The cover plate 6 is connected to the lip member 7 on the side of the lip member 7 opposite to the bottom plate 5.

Preferably, a seal 8 is provided between the lip member 7 and the bottom plate 5. In the case where the sealing member 8 is provided, the depth of the reservoir 722 may be zero. The seal 8 has a central opening 81 which is substantially rectangular in shape. The main dimensions of the central opening 81 and the rectangular opening 71 are different from each other. Specifically, a width of the central opening 81 is greater than or equal to a width of the rectangular opening 71, and a height of the central opening 81 is greater than or equal to a distance between the top edge of the rectangular opening 71 and the bottom edge of the outlet of the horizontal flow passage 53 of the bottom plate 5. Both the lip member 7 and the cover plate 6 can be fixed to the bottom plate 5 via screws through the seal 8. Preferably, the screws pass through corresponding screw holes on the cover plate 6, the lip member 7, the seal 8 and the bottom plate 5 sequentially from one side of the cover plate 6, thereby connecting and fixing these components together.

In a working state, fluid such as liquid glue from the horizontal flow passage 53 of the bottom plate 5 first reaches the back side of the dam member 72 and is blocked by the back side. The liquid glue then rises along this back side of the dam member 72, and as the liquid glue rises to the top edge of the dam member 72, the liquid glue begins to pass over the top edge of the dam member 72, through the opening 71, into the space between the cover plate 6 and the lip member 7, namely the reservoir 721, and finally flows out of the nozzle assembly through the recess 73. The flow path of the fluid material is generally indicated by the arrows in FIG. 8.

Figure 9:
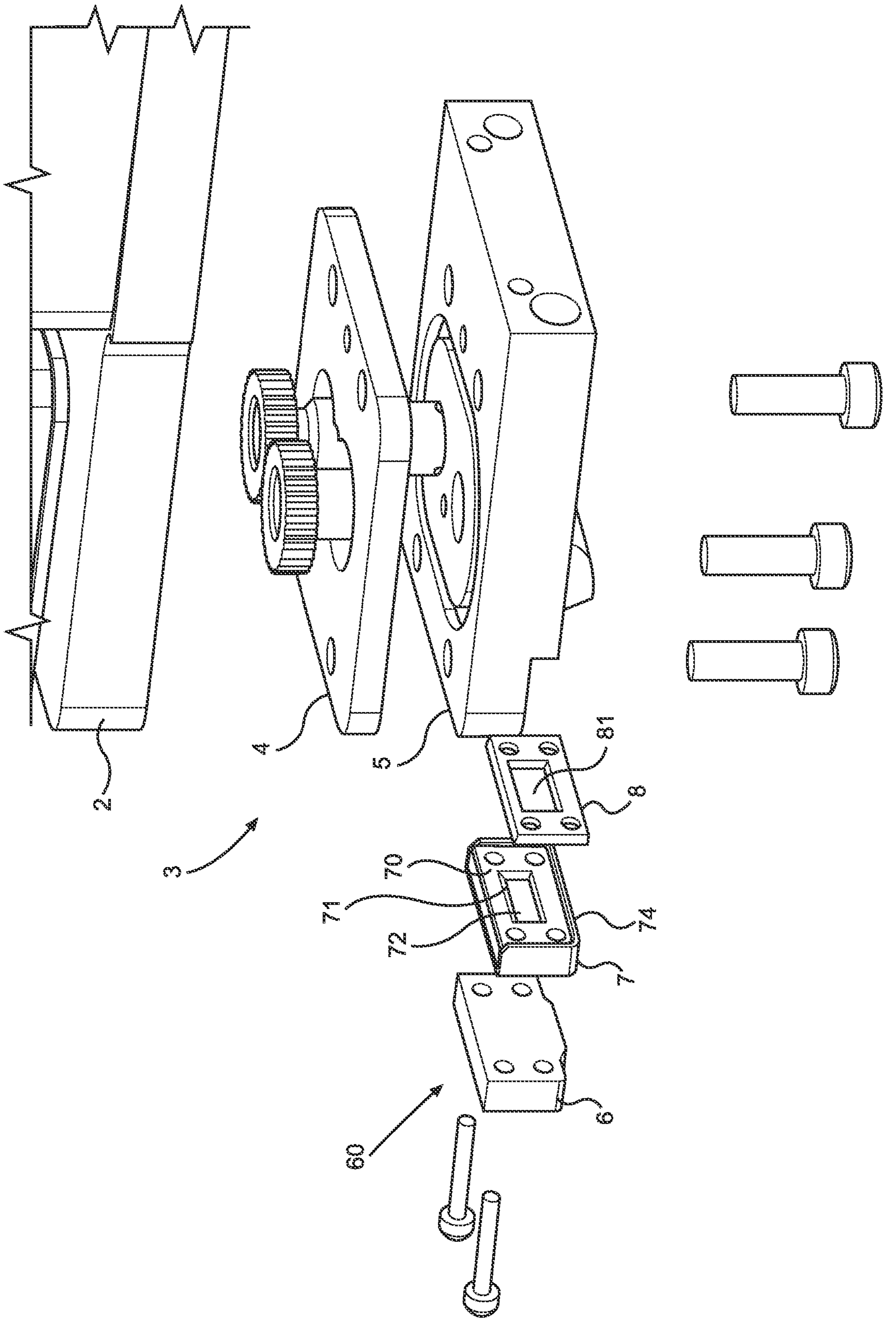
FIG. 9 is an oblique rear exploded view showing a portion of the dispensing system.

FIG. 9 shows an oblique rear exploded view of a portion of the dispensing system. The lip member 7 can be in planar contact with the seal 8. Alternatively or preferably, an outer edge of the surface of the lip member 7 on the side opposite to the cover plate 6, i.e., on the side connected to the seal 8, may be provided with a boss 74, thereby forming a recess for receiving the seal 8. This boss 74 limits the movement of the seal 8. The height of the boss is preferably less than or equal to about 60% of the thickness of the sealing member 8 to avoid interference between the boss 74 and the joint surface 541 of the bottom plate 5 after the seal 8 is compressed.

Preferably, the bottom edge of the reservoir 722 is aligned with or has the same height as the bottom edge of the outlet of the horizontal flow passage 53 of the bottom plate 5.

The various components of the dispensing system may be formed from the same material. Preferably, each component can be made of aluminum alloy. In addition, lightening holes can be provided on the components to reduce the overall weight of the system.

The assembly of the dispensing system of the present disclosure is described below. A distribution system can be divided into a plurality of subsystems, and the distribution system is obtained by assembling these subsystems. First, the lip member 7 and the cover plate 6 are fixed together with screws to form the nozzle assembly 60, that is, the first subsystem; the gear set, the gear support plate 4, the bottom plate 5 and the top plate 2 are fixed together to form the metering assembly 3, that is, the second subsystem; the fluid supply assembly that includes the feeding container 9 is assembled to form the third subsystem; the first to third subsystem groups are assembled together; and the driving device such as the motor 1 is assembled on the metering assembly 3, thereby forming the entire distribution system. It is easy to understand that the above assembly steps are not fixed, but can be freely changed in a suitable manner.

The operating principle of the dispensing system of the present disclosure is described below.

When the control assembly 11 issues a start command and the dispensing system is started, the fluid flowing from the fluid tank or hose enters the feeding container 9 of the fluid supply assembly. Fluid, such as liquid glue, enters the flow passage of the top plate 2 of the metering assembly 3 and then enters the inlet side clearance of the gear set. Driven by the motor 1, the fluid is fed by the gear set of the metering assembly 3 into the outlet-side clearance of the gear set and thus enters the bottom plate 5. Liquid glue flowing out from the bottom plate 5 passes through the seal 8 and is blocked by the dam member 72 of the lip member 7 to rise. The fluid then passes over the dam member 72, through the opening 71, into the reservoir 721 between the cover plate 6 and the lip member 7, and finally exits the nozzle assembly via the recess 73 in the form of a slot for distribution onto the surface of a workpiece or substrate such as a battery. Thus, the dispensing system utilizes a slit nozzle or a nozzle scraper to distribute an extremely thin liquid glue with a predetermined width on the target substrate. The dispensing system of the present disclosure may also be referred to as a band applicator incorporating a uniquely designed slot spraying assembly or nozzle assembly.

From the perspective of fluid flow path and working principle, the design idea of the nozzle assembly and/or distribution system of the present disclosure is obviously different from any previous design of the slit coating nozzle. The distribution system of the disclosure integrates a precision metering pump and a slot nozzle, which realizes high-precision coating performance, provides a variety of hot liquid glue supplies, provides various types of liquid glue patterns, and provides friendly human-machine interface interaction, reliable and durable spare parts, and easy maintenance. In addition, the distribution system of the present disclosure supports high-speed production lines of automated production lines.

The dispensing system of the present disclosure is suitable for coating the surface of chip batteries, electrode sheets used for manufacturing electrodes of chip batteries, and the like. The chip battery is preferably a battery for powering an electric vehicle. The power battery of an electric vehicle usually takes the form of a lithium-ion battery. Typically, the cathode of a lithium ion battery is made of aluminum sheet and the anode is made of copper sheet.

Figure 10:
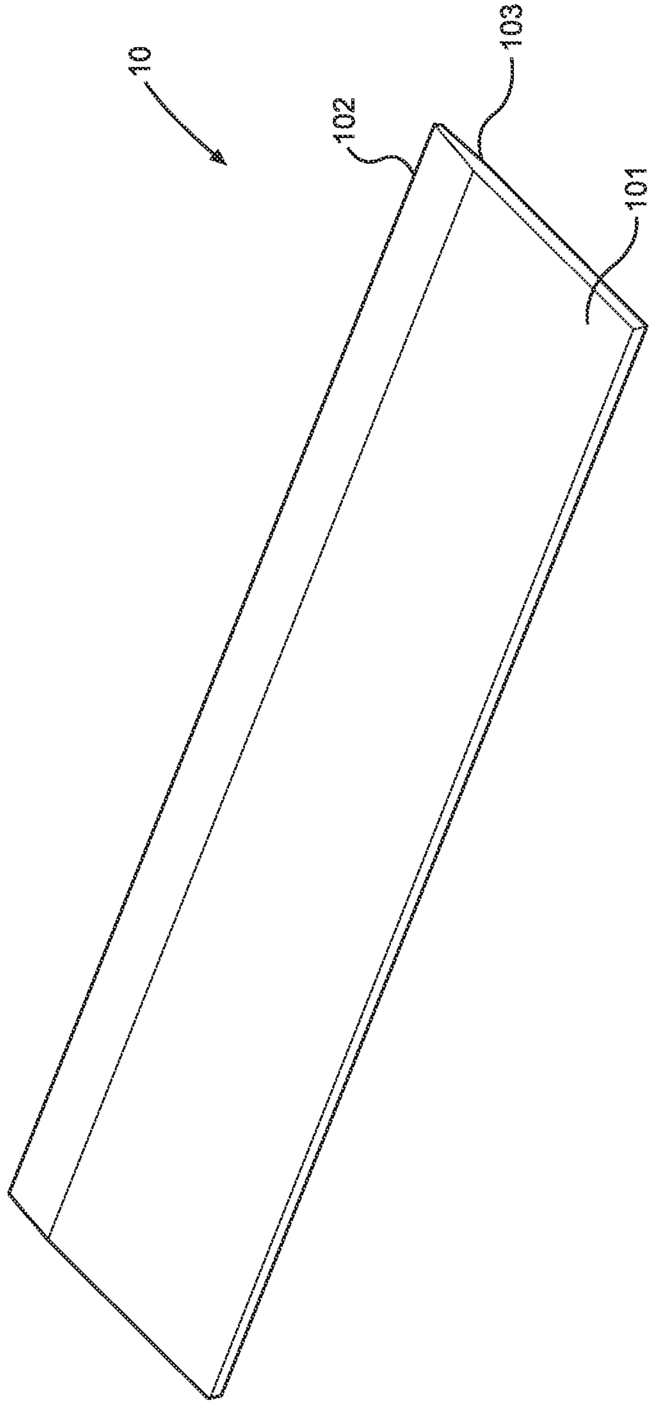
FIG. 10 is a perspective view of an electrode sheet used to produce an electrode of a battery cell.

FIG. 10 is a perspective view of an electrode sheet used to produce an electrode of a battery cell. Power batteries for electric vehicles are usually formed by laminating multiple sheet-type battery cells. Electrodes such as a cathode and an anode of each unit cell are formed by cutting an electrode sheet into segments and laminating the segments of the cut sheet together. As shown in FIG. 10, an electrode sheet 10 for producing an electrode of a battery cell has a long strip shape, and is usually wound on a reel to form a sheet reel. The electrode sheet 10 has a thicker body portion 101 and a thinner edge portion 102. The edge portion 102 has, for example, a thickness of several tens of micrometers. The edge portion 102 is located on one side in the width direction of the body portion 101. Step portions 103 are respectively formed on the upper and lower sides at the connection portion of the body portion 101 and the edge portion 102. The body portion 101 and the edge portion 102 each have a rectangular cross-section. The body portion 101 typically already has a coating on its surface to prevent corrosion. The edge portion 102 is typically bare or taped to facilitate further slitting.

Figure 11:
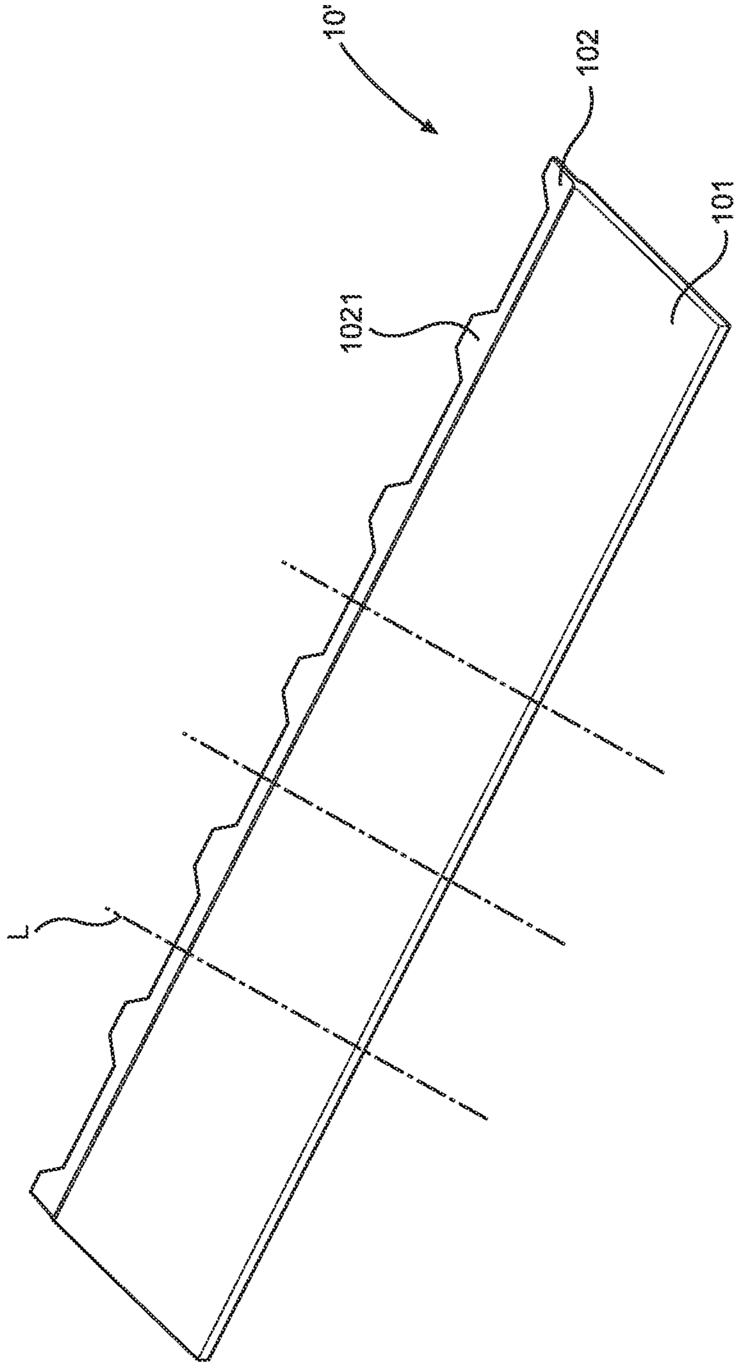
FIG. 11 is a perspective view of an electrode sheet strip obtained after the electrode sheet is slit in the prior art.

FIG. 11 is a perspective view of an electrode sheet strip obtained after the electrode sheet is slit in the prior art. In order to form an electrode segment having an electrode ear for manufacturing an electrode of a battery cell, the electrode sheet 10 shown in FIG. 10 is usually slit by a slitting machine. Driven by the driving roller, the electrode sheet 10 passes through a slitting machine, and the slitting machine performs slitting on the electrode sheet 10, for example, laser slitting. The slitting path is formed on the edge portion 102 of the electrode sheet 10 along the length direction of the electrode sheet 10, and the slitting path is generally not a straight line. For example, a plurality of ears 1021 is formed at regular intervals on the edge portion 102. The plurality of ears 1021 are formed by slitting off a portion of the edge portion 102, i.e., a cutout portion (1022, see FIG. 12). After slitting, the resulting electrode sheet strip 10' is cut along the cutting line L in the width direction of the sheet strip to form a plurality of sheet segments. Multiple sheet segments are then laminated together to form the electrodes of the chip battery.

In the prior art, as mentioned above, before slitting, the body portion 101 is coated with a coating, and the edge portion 102 can be pasted with a layer of adhesive tape to protect the entire electrode sheet 10. After slitting, the resulting ears remain partially exposed, for example at least the outer edges of the ears 1021 are exposed, and in this state the electrodes of the battery cells are formed. In working condition, the electrode is directly immersed in the electrolyte. As a result, the produced battery may be short-circuited and thus cause a fire. This poses a great security risk.

In order to solve this problem, it is necessary to coat the entire surface of the electrode sheet, especially the edges including the ears, and considering the requirement for a lower coating mass ratio, it is necessary to coat the surface of the electrode sheet with a layer of very thin coating. For example, a new conductive glue that mixes electrode material with conductive binder has been produced. The glue is coated in a very thin layer on the edge of the electrode sheet to provide protection while the electrodes conduct electricity. The thickness of the coating or primer must be strictly controlled. The thickness needs to be controlled to be less than 30 μm, preferably less than 20 μm. The nozzle assembly and the dispensing system incorporating it according to the present disclosure can solve the above-mentioned problems by allowing the recess 73 of the nozzle assembly to have an extremely small recessed depth to dispense an extremely thin layer of fluid.

In particular, a method of dispensing a fluid on a substrate having a thinner portion using a dispensing system according to the disclosure is provided. The method includes the step of dispensing a fluid onto the thinner portion of the substrate using the dispensing system. Thereby, an extremely thin (less than 20 μm) fluid layer is obtained on the thinner portions. The substrate can be, for example, a sheet material used for producing electrodes of a chip battery.

Figure 12:
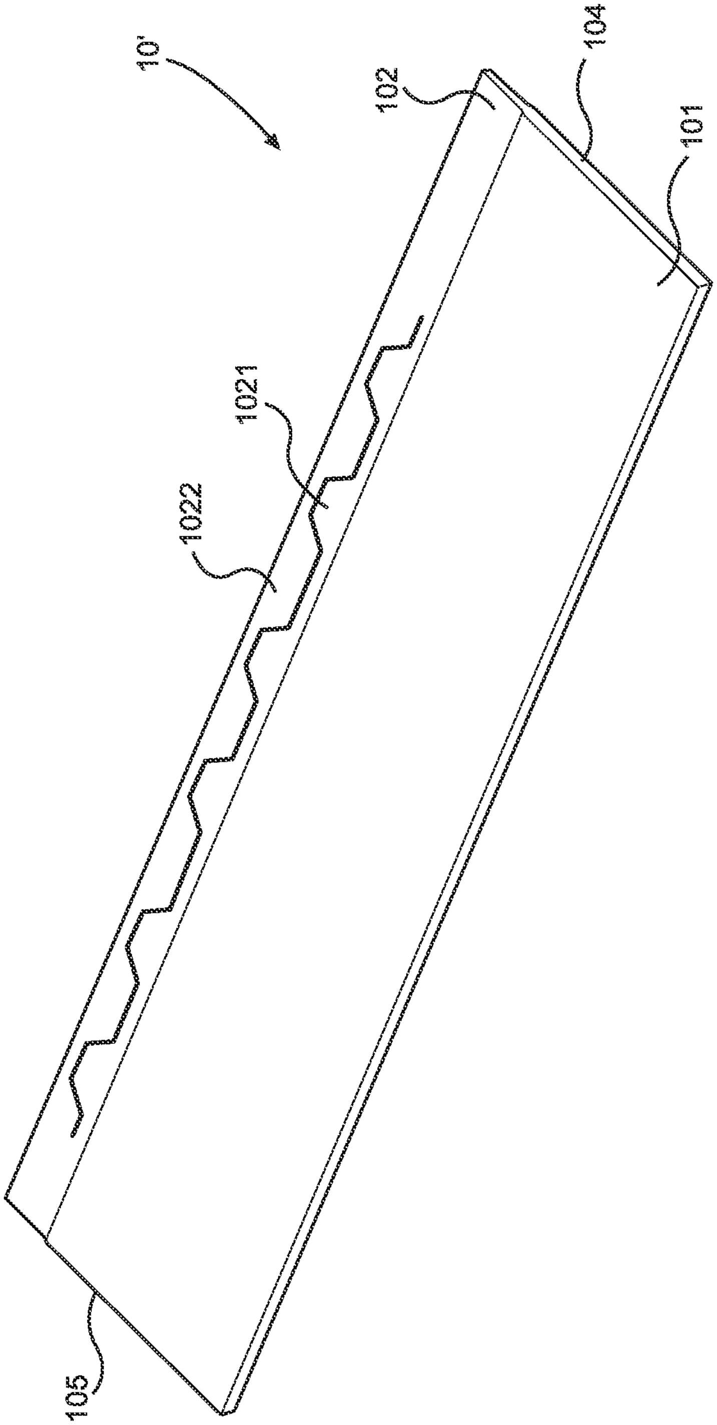
FIG. 12 is a perspective view showing an electrode sheet strip obtained after the electrode sheet is slit according to the new slitting process.

FIG. 12 is a perspective view showing an electrode sheet strip obtained after being slit according to the new cutting process. As mentioned above, in the prior art, the electrode sheet 10 as a cathode sheet or an anode sheet is sent into a slitting machine, so that the electrode sheet is slit into narrow strips suitable for electrodes of various sizes, that is, the electrode sheets strip 10'. Specifically, when preparing electrode sheet segments for manufacturing battery electrodes, it is first necessary to slit the edge portion 102 of the longer electrode sheet 10, to obtain a the electrode sheets strip 10' with electrode ears 1021 by completely removing the edge material, that is, the cutout portion 1022, and then transversely cut the region of the electrode sheet strip 10' including at least one electrode ear 1021, to obtain a plurality of sheet segments of the same size. In the prior art, the edge portion 102 of the electrode sheet 10 has an extremely small thickness, and when the electrode sheet is slit, the edge portion 102 is usually exposed or a white flat adhesive tape is pasted between the coating area of the electrode sheet 10, i.e., the body portion 101, and the blank area, i.e., the edge portion 102, and the electrodes formed thereby are at least partially exposed. This poses a certain safety risk to the battery.

However, with the dispensing system according to the present disclosure, it is possible to dispense a very thin layer of fluid on the edge portion 102 after slitting, thereby forming a very thin coating. The thickness of the coating is usually less than 20 μm. Due to the extremely thin coating, the coating mass is kept small while protecting the edge portion.

On the other hand, as shown in FIG. 11, the electrode ear 1021 is trapezoidal, and the outer edge (or slitting path) of the edge portion 102 after slitting is not a straight line. Therefore, if the surface of the electrode sheet after slitting, such as the surface of the edge portion 102, is directly coated with fluid such as liquid glue, then since the width of the nozzle edge remains constant, the liquid glue will obviously stick to the feeding roller for feeding the electrode sheet, thereby contaminating the slitting machine. Moreover, due to the thicker glue layer sprayed by the existing trough dispenser, it is impossible to distribute glue to directly wrap the slot-like outer edges of the electrode sheet strips.

Therefore, it is necessary to seal the outer edge of the electrode sheet strip 10' with glue before the electrode sheet strip 10' is further cut into sheet segments for forming final electrodes. That is to say, the electrode ears of the electrode sheet strip 10' also need to be sufficiently protected before forming the sheet segments. If the slot-like outer edge of the electrode sheet strip is glued directly, the outer edge cannot be effectively glued directly along the entire corner because the outer edge is too thin.

However, with the present disclosure, a completely new type of sheet slitting and sizing edge sealing process is provided, wherein the fluid dispensing step is carried out immediately once the electrode sheet is slit. Specifically, as shown in FIG. 12, according to the present disclosure, when the electrode sheet 10 is slit, the edge material of the electrode sheet, that is, the cutout portion 1022 is not completely removed. Conversely, when slitting, the slitting machine starts slitting at a certain distance from the leading end 104 of the electrode sheet. In addition, the slitting machine ends the slitting at a certain distance from the trailing end 105 of the electrode sheet. That is, the slit path does not extend the entire length of the electrode sheet 10. Through the above-mentioned slitting process, the edge material to be removed of the electrode sheet, that is, the cutout portion 1022 is not removed during slitting, thereby forming an integral electrode sheet strip 10' including the sheet body and the cutout portion. The sheet body includes at least a body portion 101 and ears 1021. In the prior art, the cutout portion of the electrode sheet is directly peeled off from the body of the electrode sheet. In contrast, in this new process, although the continuous slit 1023 (see FIG. 13) are cut on the electrode sheet 10 toward the feeding direction, the electrode sheet strip 10' after slitting or being transported to the dispensing system remains in one piece, comprising the cutout portion 1022 to be removed.

Figure 13:
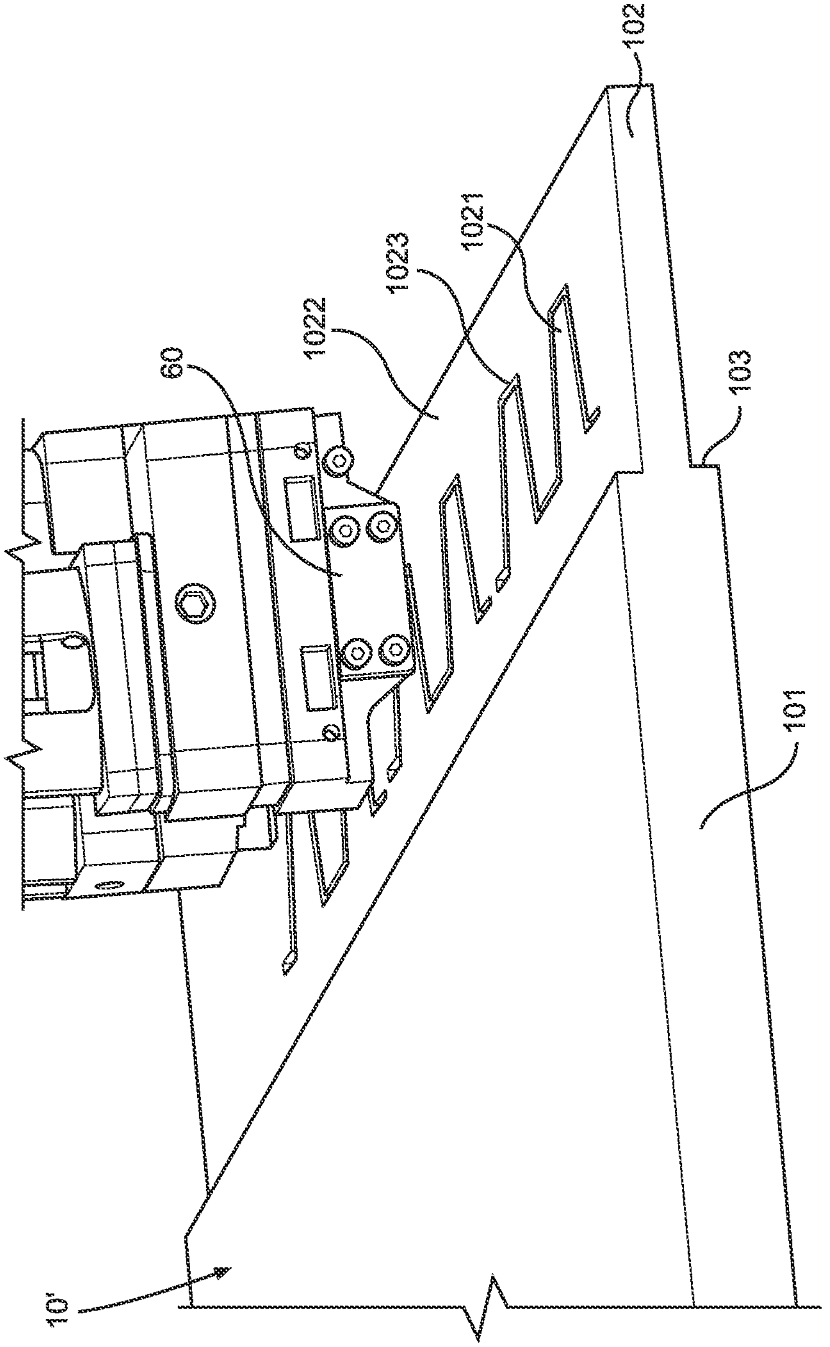
FIG. 13 is a schematic diagram showing the working principle of the combination of the dispensing system according to the present disclosure and the new slitting process.

FIG. 13 is a schematic diagram showing the working principle of the combination of the dispensing system according to the present disclosure and the new slitting process. As shown in FIG. 13, the electrode sheet strip 10' obtained after slitting still is an integral part including the edge material, that is, the cutout portion 1022 and the sheet body, and then is fed under the nozzle assembly 60 according to the present disclosure. Thereafter, the dispensing system sprays fluid, such as liquid glue, evenly on the edge portion 102 of the sheet. According to the actual size of the sheet, the best size slit pattern can be selected. As long as the edge portion 102 is coated with a fluid such as liquid glue, there will be a thin layer of fluid in the slit 1023 on the edge portion 102. The nozzle assembly 60 is in close proximity to the substrate surface, i.e. the surface of the edge portion 102 of the electrode sheet strip 10', so as to scrape the fluid on the edge portion 102 to some extent. At the same time, due to the gravity of the fluid, the fluid drops down into the slit 1023 and possibly penetrates the slit 1023. Due to this reaction, the fluid will gradually wrap around the opposing sides of the slit 1023. Further, when the electrode sheet strip 10' obtained after slitting is reversely fed on the feeding roller after one-sided coating, the other surface of the electrode sheet strip 10' can be subjected to the same coating treatment. Finally, the useless narrow trim, i.e., the cutout portion 1022, will peel off from the body of the sheet as the additional separation process proceeds. Thus, the outer cutting edge of the electrode sheet strip 10' obtained after slitting is also completely wrapped by the fluid. The outer cutting edges include the outer edges of the ears 1021 and the outer edges between the ears 1021. Thus, complete coating protection of the electrode ears 1021 of the electrode sheet strip 10' obtained after slitting is achieved.

The existing slitting process directly uses a laser to continuously cut the electrode sheet in the shape of the electrode ear. According to the disclosure, a brand-new electrode ear slitting and coating process is provided, especially the edge-sealing process, which can provide a new battery cell manufacturing technology, which can increase the energy of electric vehicle batteries density and reduce safety risks. The technology described in this application is to add a dispensing system such as a dispensing nozzle/head in the slitting process. According to the new process requirements, it not only realizes a very thin special glue such as conductive glue on the sheet surface of the electrode ear, but also the outer edge of the electrode sheet strip obtained after slitting is protected by edge sealing, such as coating.

In the solution of the disclosure, a new glue of mixed electrode material and conductive adhesive is formed in a specific way. The glue conducts electricity and is coated in a very thin layer on the surface of the electrode sheet. By using the distribution system and the nozzle assembly of the disclosure, the coating thickness can be controlled between 20-30 μm or even thinner. As a result, a low coating quality is achieved while effectively protecting the electrode ears.

As shown in FIGS. 12-13, in order to avoid direct coating of fluid such as glue on the extremely thin edge of the outer side of the electrode sheet strip obtained after slitting, the continuous electrode sheet slitting and coating process is finely adjusted. According to an embodiment, the sheet still remains as a whole after the slitting process of the sheet. Then, fluid such as liquid glue is scraped and coated on the surface of the edge portion 102 by the edge of the nozzle, and pressed into the slit 1023. Then, the same coating treatment was performed on the other side of the sheet. Finally, fluid is able to penetrate the slits 1023, thereby completely sealing the entire narrow edge of the outside of the electrode sheet strip.

The size of the slit 1023 of the sheet can be optimized according to actual needs, so as to obtain the best edge sealing effect. For example, the size of the slit 1023 may be determined according to the thickness of the edge portion, the coating temperature of the fluid, the sheet feeding speed, and the like. The distribution system can be mounted directly on the slitting machine or separately in front of the slitting machine in an advance direction of sheet. Thereby, the sheet can be subjected to coating on the surface as well as on the sides after slitting. This provides a brand-new method for coating the outer edge of the electrode ear of the electrode sheet of the lithium-ion battery, which is completely different from the existing coating method.

Alternatively, the nozzle assembly and/or dispensing system according to the present disclosure can be used for coating treatment directly on the electrode sheet strip shown in FIG. 11. In this case, it is necessary to strictly control the glue output and coating speed to avoid contamination of the feeding roller as much as possible.

Furthermore, at the step portion 103 between the body portion 101 and the edge portion 102 of the sheet, it is possible to perform a separate coating process to protect the surface of the step portion. Thereby, the use of adhesive tape is avoided. Moreover, the width of the nozzle edge of the nozzle assembly can be selected and kept constant, so that when the fluid is dispensed onto the substrate, the coating width can be kept consistent, and by setting/selecting the recessing depth of the recess 73 of the nozzle assembly, a glue thickness of less than 30 μm, preferably 20 μm is achieved.

In this disclosure, a band-shaped coating distribution system combined with the improvement of the electrode sheet manufacturing process is obtained, which will provide the best equipment and technical solutions, not only accurately and consistently applying an extremely thin adhesive layer of less than 30 μm, preferably less than 20 μm in the electrode sheet used to manufacture sheet electrodes, but also completely sealing the outer edge of the sheet.

The disclosure also relates to an electrode sheet strip. The electrode sheet strip is obtained through the above-mentioned novel slitting and edge-sealing process. The disclosure also relates to an electrode of a chip battery, which includes a plurality of electrode segments, the electrode segments being manufactured from the electrode sheet strip obtained according to the above process. A plurality of electrode segments are laminated together to form the electrode. The disclosure also relates to a chip battery, which includes electrodes obtained by laminating the electrode segments obtained according to the above method. The performance and safety of electric vehicles equipped with such batteries can be greatly improved.

Specific embodiments of the present disclosure have been described in detail above with reference to the accompanying drawings. It is anticipated that various changes and modifications may be made to the disclosure without departing from the spirit and scope of the disclosure as defined by the appended claims.

LIST OF REFERENCE SIGNS

1 motor
2 top plate
21 vertical flow passage
22 horizontal flow passage
23 vertical flow passage
3 metering assembly
31 driving gear
32 driven gear
4 gear support plate
5 bottom plate
51 sealing groove
52 vertical flow passage
53 horizontal flow passage
54 protrusion
541 joint surface
6 cover plate
65 guide boss
651 step
7 lip member
70 body portion
71 rectangular opening
72 dam member
721 reservoir
722 reservoir
73 recess
74 boss
75 guide boss
8 sealing member
81 central opening
9 feeding container
10 electrode sheet
101 body portion
102 edge portion
1021 ear
1022 cutout portion
1023 slit
103 step portion
10' electrode sheet strip
11 control assembly

The invention claimed is:

1. A nozzle assembly, comprising:

a lip member that has an annular body portion and a dam member at a center, the dam member extending from a bottom edge of a rectangular space surrounded by the annular body portion toward a top edge such that a rectangular opening is formed between a top edge of the dam member and the top edge of the rectangular space, the dam member extending an entire width of the rectangular opening in a transverse direction of the lip member, the rectangular opening being adapted to receive a fluid; and a cover plate configured to be connected to the lip member, wherein the dam member is recessed relative to a surface of the lip member connected to the cover plate so that a reservoir is formed between the cover plate and the dam member, the reservoir being in fluid communication with the rectangular opening, and a recess is provided on one surface of two surfaces of the cover plate and the lip member facing each other, the recess being in fluid communication with the reservoir so that the fluid can flow out from the reservoir through the recess in a strip shape, wherein the one surface forms the recess and faces another one of the two surfaces.

2. The nozzle assembly according to claim 1, wherein the recess is provided on a surface of the lip member facing the cover plate, and in the transverse direction, a width of the recess is less than or equal to a width of the dam member.

3. The nozzle assembly according to claim 1, wherein the recess is recessed by 50 to 150 μm with respect to the surface on which the recess is provided.

4. The nozzle assembly according to claim 1, wherein the dam member is recessed with respect to a surface on a side of the lip member opposite to the cover plate.

5. The nozzle assembly according to claim 1, further comprising: a boss provided on an outer edge of a side of the lip member opposite to the cover plate, for receiving a seal.

6. The nozzle assembly according to claim 1, further comprising a guide boss is provided on a bottom surface of the cover plate and/or a bottom surface of the lip member.

7. The nozzle assembly according to claim 1, wherein the cover plate and the lip member are fixed together by screws.

8. A dispensing system, characterized by comprising:

a fluid supply assembly;

a metering assembly in a form of a volumetric cavity pump and configured to be in fluid communication with the fluid supply assembly to receive a fluid from the fluid supply assembly; and a nozzle assembly in fluid communication with the metering assembly to receive the fluid from the metering assembly, wherein the nozzle assembly is a nozzle assembly according to claim 1.

9. The dispensing system according to claim 8, wherein the fluid supply assembly includes a feeding container that is configured to accommodate a fluid cartridge or to be connected with a pipe for supplying the fluid.

10. The dispensing system according to claim 8, wherein the metering assembly includes a driving gear and a driven gear.

11. The dispensing system according to claim 10, wherein the metering assembly includes:

a top plate having a top plate flow passage for receiving the fluid from the fluid supply assembly;

a bottom plate having a bottom plate flow passage in fluid communication with the rectangular opening of the nozzle assembly; and a gear support plate located between the top plate and the bottom plate and having an aperture at a center for accommodating the driving gear and the driven gear.

12. The dispensing system according to claim 11, wherein respective gear shafts of the driving gear and the driven gear are inserted into corresponding bores of the bottom plate to provide positioning of the gear shafts.

13. The dispensing system according to claim 11, characterized in that: a clearance between the driving gear and the driven gear on one side of the metering assembly is in fluid communication with the top plate flow passage of the top plate, and a clearance between the driving gear and the driven gear on the other side of the metering assembly is in fluid communication with the bottom plate flow passage of the bottom plate.

14. The dispensing system according to claim 11, characterized in that: a sealing member is provided between the gear support plate and the bottom plate, the sealing member surrounding the aperture in the gear support plate.

15. The dispensing system according to claim 11, wherein the lip member of the nozzle assembly is connected to the bottom plate so that the top edge of the dam member is higher than an outlet of the bottom plate flow passage.

16. The dispensing system according to claim 11, characterized in that: a seal is provided between the lip member and the bottom plate, the seal having a rectangular central opening.

17. The dispensing system according to claim 16, wherein a width of the rectangular central opening is greater than or equal to a width of the rectangular opening, and a height of the rectangular central opening is greater than or equal to a distance from the top edge of the rectangular opening to a bottom edge of an outlet of the bottom plate flow passage of the bottom plate.

18. The dispensing system according to claim 11, wherein the bottom plate has a protrusion, in which an outlet of the bottom plate flow passage of the bottom plate is provided, the protrusion being adapted to be connected to the lip member.

19. A method for dispensing a fluid onto a substrate using a dispensing system according to claim 8, the substrate having a thin portion, wherein the method comprises a step of:

dispensing a fluid onto the thin portion of the substrate using the dispensing system.

20. The method according to claim 19, wherein the substrate is an electrode sheet for manufacturing an electrode of a cell, the electrode sheet having a thick body portion and a thin edge portion, the thin edge portion being located on a side of the thick body portion and continuous with the thick body portion, the method comprising a step of:

dispensing the fluid onto a surface of the thin edge portion, using the dispensing system, to produce an electrode sheet strip.

21. The method according to claim 20, wherein the method comprises:

feeding the electrode sheet to a slitting machine, and slitting the thin edge portion along a slitting path using the slitting machine; and after the slitting, dispensing the fluid onto the surface of the thin edge portion, using the dispensing system, to produce the electrode sheet strip.

22. The method according to claim 21, wherein the slitting machine starts slitting at a certain distance from a leading end of the electrode sheet, and ends the slitting at a certain distance from a trailing end of the electrode sheet.

23. The method according to claim 22, wherein the thin edge portion of the electrode sheet is slit such that a width of a slit on the thin edge portion is suitable for the fluid from the dispensing system to completely penetrate the slit.

24. The method according to claim 21, wherein the slitting path is non-linear.

25. The method according to claim 24, wherein the thin edge portion is slit to form a plurality of electrode ears along the slitting path.

26. An electrode sheet strip for manufacturing an electrode of a cell, wherein the electrode sheet strip is manufactured using a method according to claim 20.

27. The electrode sheet strip according to claim 26, wherein the electrode sheet strip is cut into a plurality of sheet segments having a same shape along a width direction, the plurality of sheet segments being laminated together to constitute the electrode.

28. The nozzle assembly according to claim 1, wherein a depth of the recess, between the lip member and the cover plate, perpendicularly to the transverse direction is less than the width.

29. The nozzle assembly according to claim 1, wherein the reservoir is in fluid communication with the rectangular opening so that fluid can flow between the lip member and the cover plate from the rectangular opening.

30. The nozzle assembly according to claim 1, wherein the lip member is formed as one piece.

* * * * *